Figure 1:
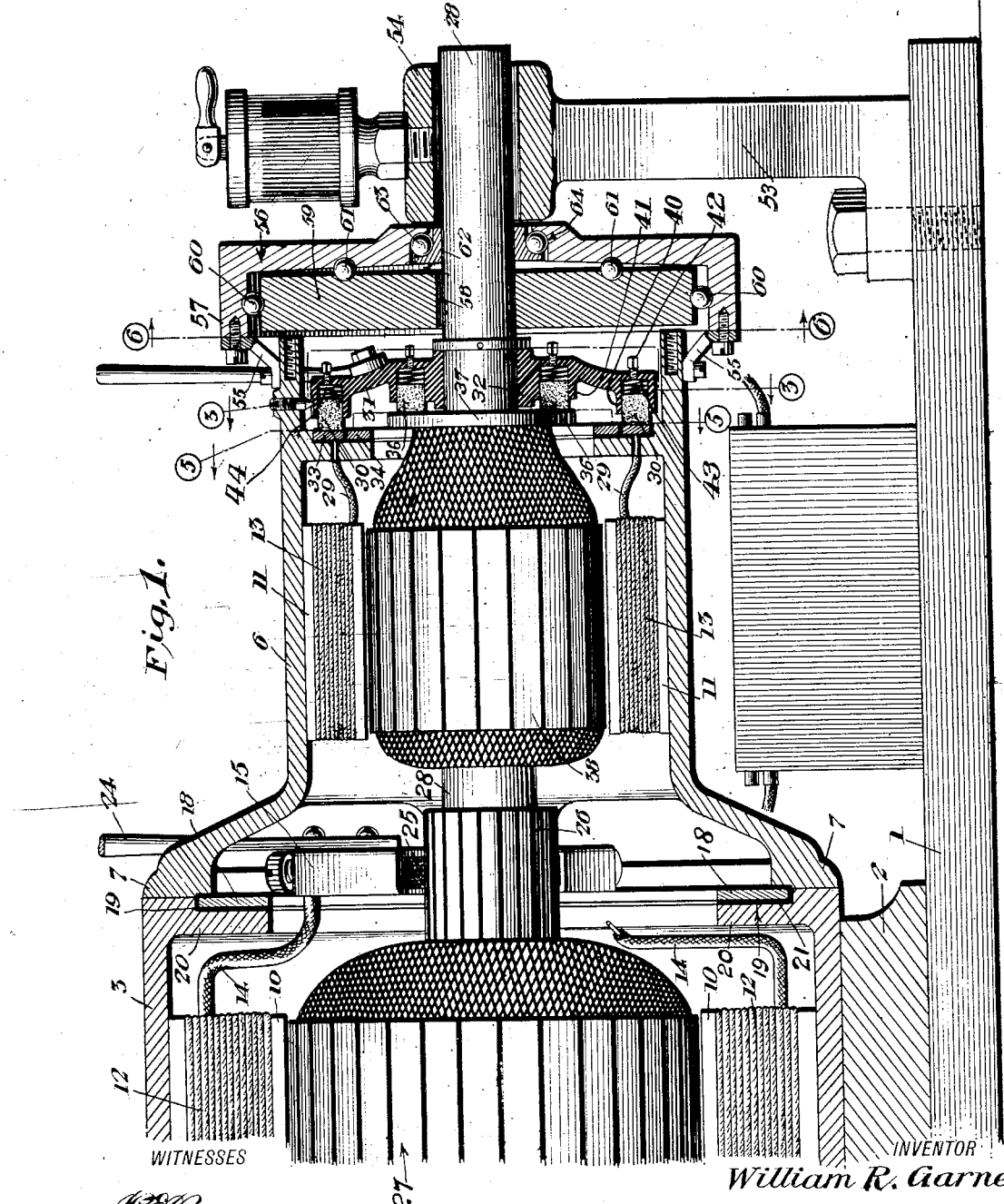

Sept. 9, 1924.  1,508,096

W. R. GARNER

ELECTRIC MOTOR GENERATOR

Filed Nov. 26, 1919    5 Sheets-Sheet 1

WITNESSES
R. E. Rousseau
J. P. Schrott

INVENTOR
William R. Garner,
BY
ATTORNEYS

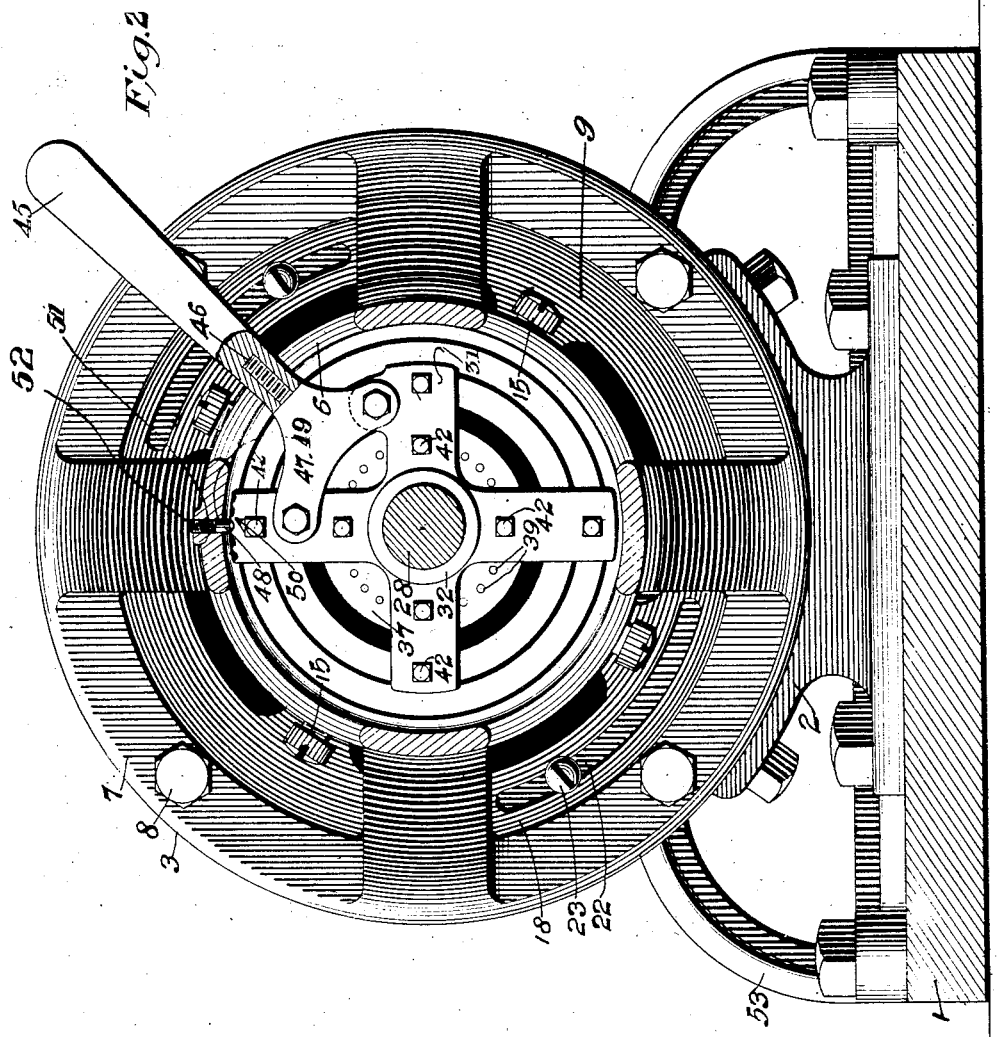

Sept. 9, 1924.                    W. R. GARNER                    1,508,096
                              ELECTRIC MOTOR GENERATOR
                               Filed Nov. 26, 1919        5 Sheets-Sheet 3
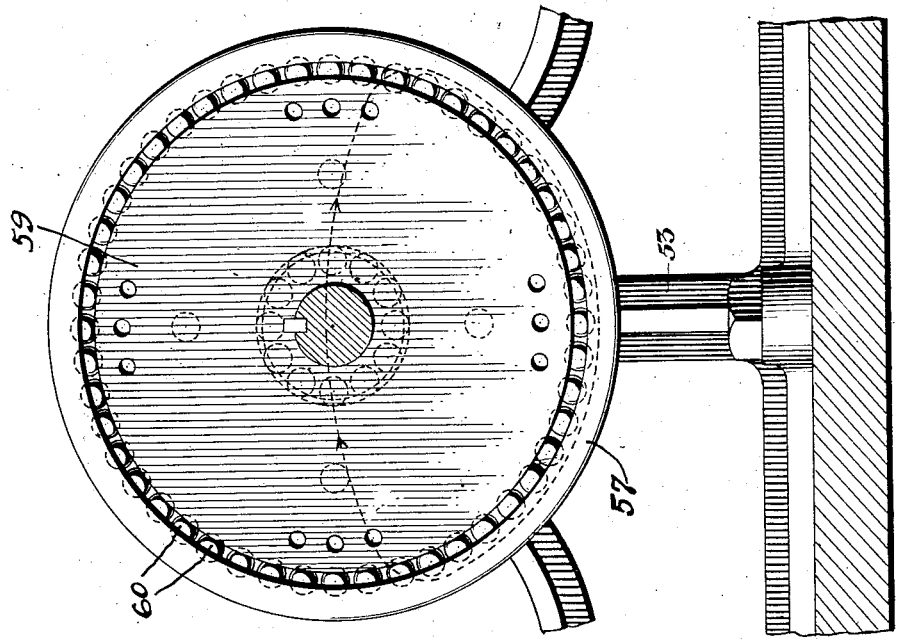
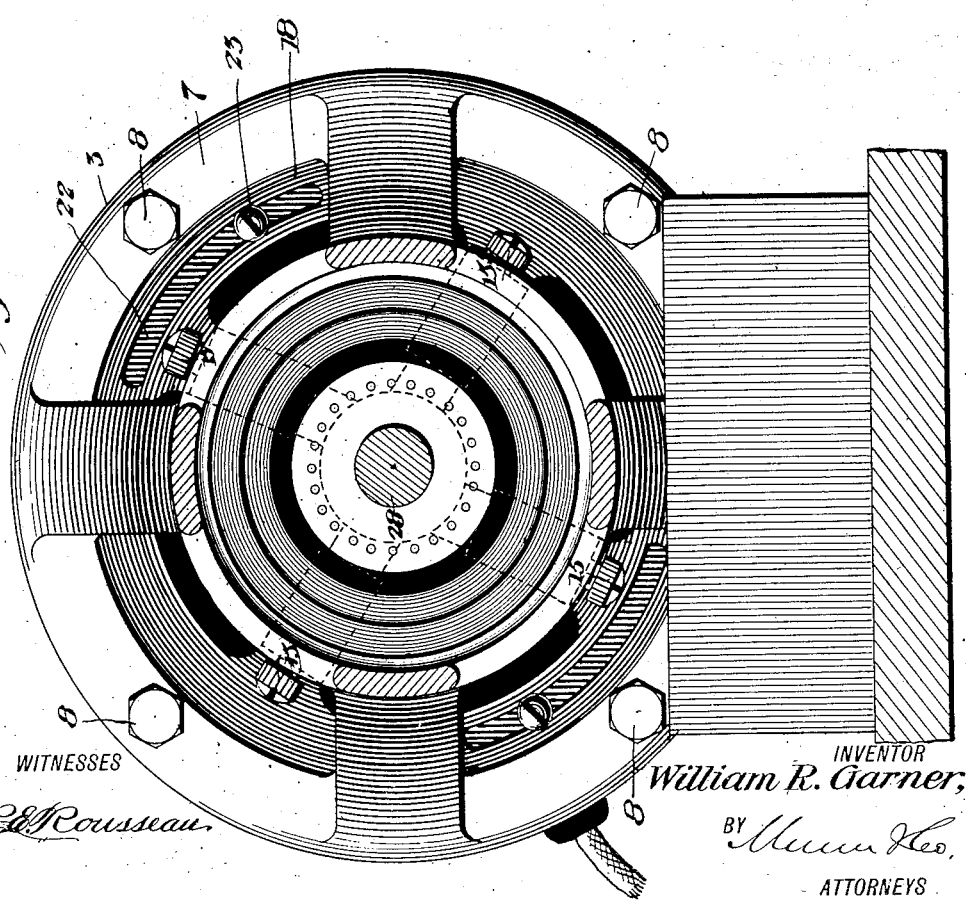
WITNESSES
R&W Rousseau
INVENTOR
William R. Garner,
BY
ATTORNEYS

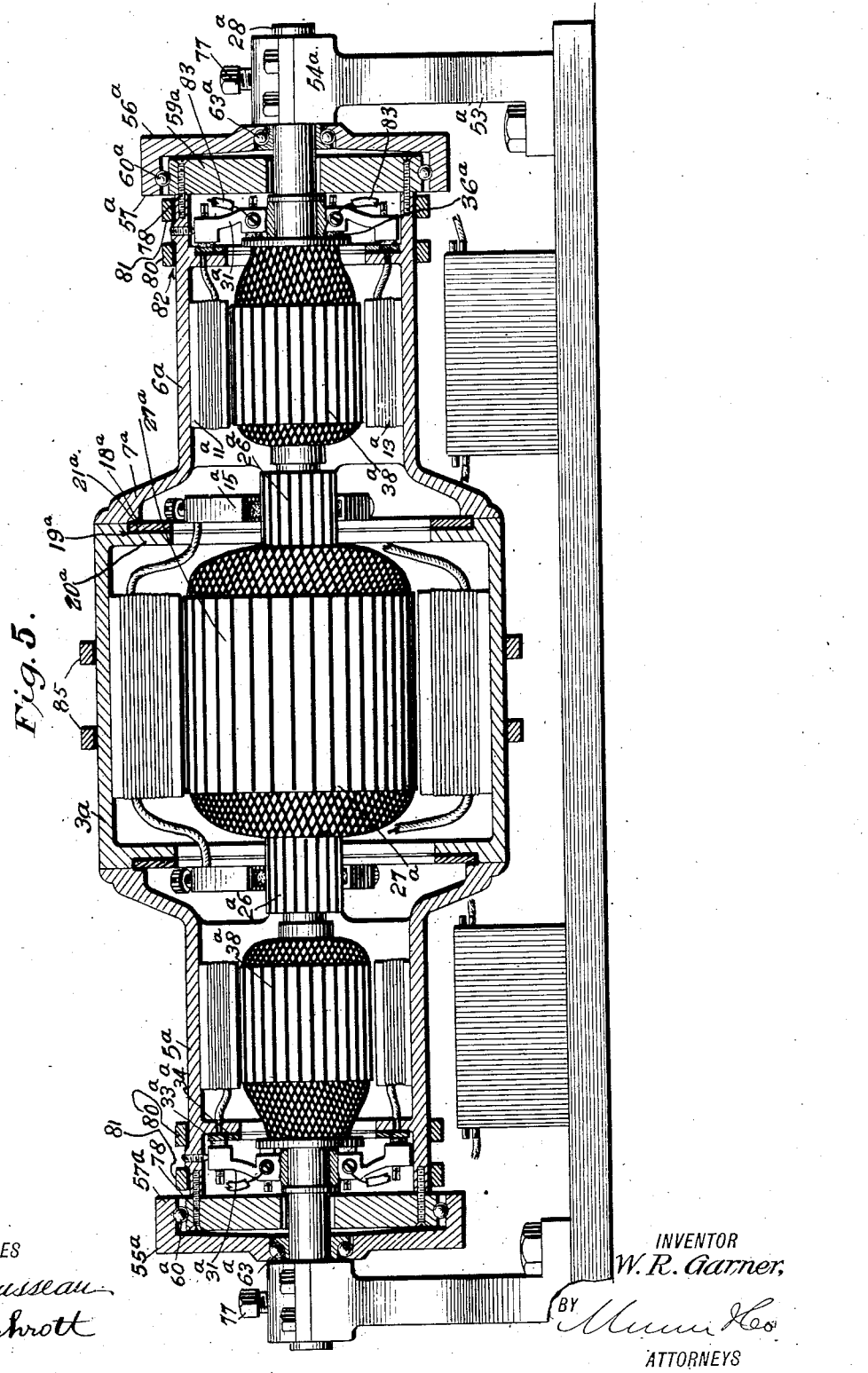

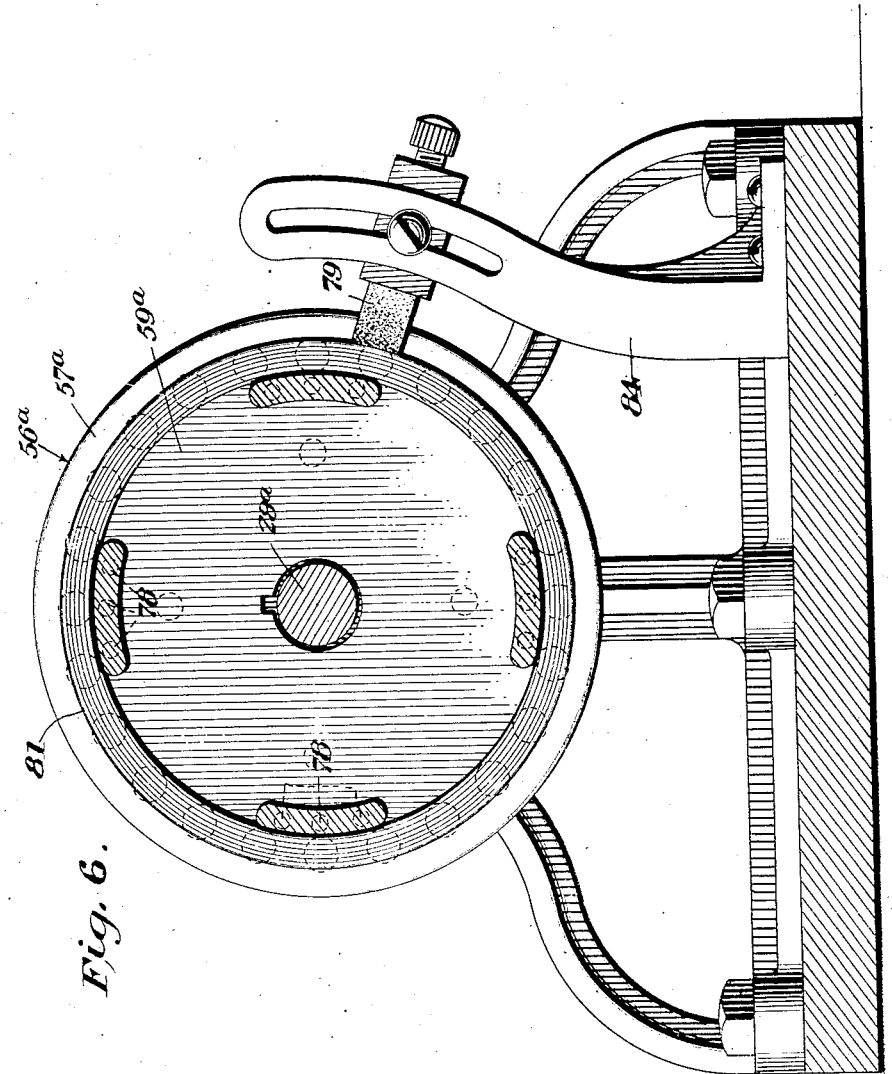

Patented Sept. 9, 1924.

1,508,096

UNITED STATES PATENT OFFICE.

WILLIAM ROBERT GARNER, OF ERIE, PENNSYLVANIA.

ELECTRIC MOTOR GENERATOR.

Application filed November 26, 1919. Serial No. 340,787.

*To all whom it may concern:*

Be it known that I, WILLIAM ROBERT GARNER, a citizen of the United States, and a resident of Erie, in the county of Erie and State of Pennsylvania, have invented certain new and useful Improvements in Electric Motor Generators, of which the following is a specification.

My invention relates to improvements in electric motor-generators, and it consists in the constructions, combinations and arrangements herein described and claimed.

The foremost object of my invention is to provide an electric generator embodying improved bearing means for the armature shaft thereby greatly enhancing the efficiency of the machine and increasing the output.

Another object of the invention is to provide an improved bearing structure for electric generators, and the like, of either the rotating field and stationary armature, or stationary field and rotating armature types, wherein the weight of the moving part is sustained in a substantially elliptical bearing zone, as appears more fully below.

A still further object of the invention is to provide an electric generator, wherein the parts are perfectly counter balanced, thereby enabling operation at highest efficiency with a minimum of applied power.

Other objects and advantages will appear in the following specification, reference being had to the accompanying drawings, in which:—

Figure 1 is a detail sectional view of one end, showing a part of the generator, one of the driving motors and details of the improved bearing mechanism, Figure 2 is a cross section on the line 3—3 of Figure 1, Figure 3 is a cross section on the line 5—5 of Figure 1, Figure 4 is a cross section on the line 6—6 of Figure 1, showing the arrangement of the main and auxiliary wheels, which form an important part of the improved bearing mechanism, Figure 5 is a longitudinal section of the improved generator, of the rotating shell type, clearly showing the arrangement of the end driving motors and the improved bearing structure, and Figure 6 is a detail cross section.

In its broad aspects the invention is fundamentally based on the combination of a rotating part of an electric generator, with an improved bearing structure, which operates in such a way as to reduce the friction between the moving parts to a greater degree than can be done by bearings as commonly employed. The description of the invention is best divided into three subjects, namely, the fixed shell type generator in Figures 1 to 4 and the rotating shell type in Figures 5 and 6, and the construction of the bearing structure used in both types. Consider first the fixed shell type generator in Figure 1. Fixed on the common base 1 by means of the supporting yoke or bracket 2, is the circular frame 3 of the generator, which by reason of its attachment at 4 to the yoke 2, is stationary in this particular type of generator. Extending at each side of the frame 3 are motor frames such as 6 in Fig. 1 and $5^a$ and $6^a$ in Fig. 5. Each includes a flange 7, which is affixed at 8, to the rim of the generator frame 3, there being intermediate openings 9 through which access is had to the inside, for purposes of adjustment and ventilation.

These frames 3 and 6 are parts of the magnetic fields of the generator and motors, by reason of the fact that the various field pole pieces are suitably connected thereto on the inside, as clearly shown in Figure 1, to which attention is now directed. The field pole pieces 10 of the generator, as well as the field pole pieces 11 of the motor 6, are preferably of the laminated body type, that is to say, instead of the pole pieces being made of solid metal, they are built up of a great number of thin plates bolted together and in turn bolted to the respective casings.

The windings 12, 13 are applied, and while it is the purpose in this connection to arrange the windings in a certain specified manner, in order to produce the strongest possible magnetic field, still the illustration of this specific arrangement is here omitted, because emphasis is desired to be laid on the particular bearing structure and the combination of the moving generator parts with that bearing structure.

It is to be observed, however, that while in actual practice, the generator field magnet is shunt wound, it may be wound according to other approved methods. Wires 14 run from the field coils to the brush holders 15, from which the main current wires 16, 17 in turn extend. The generator 3 being of the multipolar type, consequently has a plurality of brush holders 15, all of which are suitably mounted on a ring 18.

This ring is disposed in a recess 19 in the flange 20 of the generator casing as in Figure 1, the ring being insulated at 21, and provided at 22 with arcuate slots for the purpose of receiving the set screws 23 and enabling circular adjustment by virtue of the handle 24.

It is evident to the reader that the ring 18 and brush holders 15 which hold the brushes 25, are to be adjusted in reference to the field pole pieces 10 of the generator 3. The generator shaft 28 in this form of the invention rotates.

Considering next the motor 6 which is illustrated in Figure 1, it is to be observed that the same method of pole piece formation and winding is here carried out as in the case of the generator described above, wires 29 leading from the windings of the pole pieces to the stationary brushes 30 of the brush holder 31, which includes the hub 32 surrounding the shaft 28. The wires 29 do not connect directly with the various brushes referred to, but alternately connect to separate connector rings 33, 34.

The purpose of the separate rings 33, 34 is not as apparent in the type of motor-generator now in the course of description, as it will be in the other type, wherein the shell revolves. It will become apparent further on that connection to the pole pieces, or rather the coils thereof, must be maintained during the rotation of the shell, in the latter form of the invention, and it is for the furtherance of this second purpose that the two separate rings are provided.

Brushes 36 bear on the lateral face of an insulating disk 37, at which the ends of the windings of the armature 38 are brought through as at 39 in Figure 2. This disk constitutes the commutator of the motor armature 38.

This improved commutator is designed especially for this type of machine, the arrangement shown in Figure 2 enabling the condensing of the parts without sacrificing any needed strength or diminishing any ordinarily important function. As particularly shown in Figure 1, the various brushes 30, 36 are sustained in housings 40, 41, the pressure of the brushes against the respective parts, being regulated by set screws 42 which carry disks 43 in engagement with intermediate springs 44.

Adjustment of the screws is easily made from the outside, by simply inserting a suitable wrench. Adjustment of the brush holder 31 is effected through the handle 45 which is capable of being unscrewed at 46 without removal from the bridge piece 47, in turn carried by the brush holder. The handle 45 is to be taken off when the machine is to be operated as the rotating shell type of generator, because obviously in that mode of operation, the handle 45, as well as 24, would be in the way, and therefore must be taken off.

In order to keep the brush holder 31 at its various adjustments, a plug 48, with a head 49, is made to engage the toothed portion 50 of the brush holder 31 by virtue of the spring 51 beneath the screw plug 52. Obviously, the brush holder 31 will be held in its adjusted positions, upon moving the handle 45, by the holding action of the member 48.

Standards 53, on the extremities of the base 1, have bearings 54 through which the extremities of the armature shaft 28 extend. These bearings are, however, not for the purpose of providing journals for the shaft 28, as it might appear, but on the contrary are for the purpose of fixedly holding the armature shaft when the shell of the generator is made to rotate, as appears in connection with the description of Figure 5. It is therefore important at this time, to understand the construction and operation of the improved bearing structure, by means of which the armature shaft 28 is supported independently of the bearing standards just mentioned. Secured, by means of brackets 55, to the motor shell 6, is the main wheel 56, round in form and including the angular flange 57 to the rim of which the brackets 55 are secured as shown.

Keyed at 58 to the armature shaft 28, is the auxiliary wheel 59, which operates inside of the main wheel, ball bearings 60, 61 being positioned between the bearing surfaces so as to reduce friction. A bearing cone 62 on the shaft 28, supports ball bearings 63, which in turn run in a ball race 64, included as a part of the main wheel 56.

It is therefore clear to the reader that the operation of the generator of the type in Figure 1, wherein the shell is stationary, the main wheel 56 is stationary by reason of the bracket connections 55, but the auxiliary wheel 59 revolves inside of the main wheel, since it is carried by the revolving shaft 28.

Special emphasis is desired to be laid on the result of supporting the rotating armature shaft in the manner stated. If the armature shaft were supported merely by an ordinary small ball race, such as shown between the main wheel 56 and the shaft 28, all the weight of the armature shaft would be imposed directly on those balls immediately beneath the shaft and occupy a zone not wider than the diameter of the shaft projected downwardly. But by greatly enlarging the diameter of the ball race, as shown for example in Figure 1, a much wider bearing surface is produced, this having the result of distributing the weight over a wider zone and consequently reducing the friction.

The supporting zone is of a substantially elliptical shape as indicated by the dotted arrow in Fig. 4.

After the motors of the machine are once started and the shaft 28 of the generator brought to the proper speed of rotation, the current from the outside source may be gradually cut down, but this not resulting in any diminution of the output of the generator. This result is obtained by reason of the improved bearing structure just described. It being thereby possible to support the armature shaft so that it will tend to rotate longer with a given applied force, rather than gradually diminish in speed of rotation by reason of the dragging effect of the old fashioned type of supporting bearings, makes it easy to understand that a lesser amount of current from an outside source need be used in order to keep the operation of the machine up to the required standard.

The revolving shell type in Figure 5 operates precisely on the same principles as the fixed shell type in Figure 1, and since precisely the same parts are employed, it is thought unnecessary to repeat the description, but it may be observed that this second form of the invention is differentiated from the first, by adding the character a to each reference numeral, for the purposes of distinction. For example, the generator 3ª has the operatively associated motors 5ª, 6ª, armatures 38ª and 27ª being stationed on the inside.

Set screws 77 are employed to rigidly hold the armature shaft 28ª in the bearings 54ª, since in this type of machine the armature is stationary, while the shell revolves. The key 58 in Figure 1 is removed, and the auxiliary wheel 59ª is loose in respect to the stationary shaft 28ª.

But the auxiliary wheel 59ª moves with the revolving casing, it being connected thereto by means of screws 78, or other equivalent means. The main wheel 56ª is disconnected from the shell and is now free in respect to both the shell and shaft. This freedom of the main wheel, however, has no deleterious effect on the operation of the improved bearing structure, because it is found that with this arrangement, the same virtues formerly ascribed to the arrangement in Figure 1, are present.

It being impossible to connect the motor current wires directly to the various sets of brushes 36ª, by reason of the rotating shell, current is now conducted to a pair of brushes, one of which is shown at 79 in Figure 6, both of which brushes bear on slip rings 80, 81 in Figure 5. These rings are insulated at 82 from the casing, and are connected by means of suitably arranged wires 83 to the various sets of brushes 36ª. Current is conducted from the generator 3ª, rings 85 being mounted on the rotating shell for that purpose. The brushes which bear on these rings are not shown.

The brushes 79 are adjustable in brackets 84 (Fig. 6), for the purpose of arriving at the most desirable position. The adjustment may be fixed by any suitable means, as, for example, such as shown.

It is to be observed from the foregoing, that in all cases the machine is journalled at the motor ends, that is to say, the journals are at the extremities of the machine whether the motor-generator is of the stationary or revoluble shell type. The function of throwing the imposed weight into an elliptical zone occurs at the forward extremity of movement of the machine, and is in effect the same as a ball rolling down an inclined plane, in that there is always a tendency to project the weight forwardly, which weight is of course taken care of in the bearings.

While the construction and arrangement of the improved motor-generator as herein described and claimed, is that of a generally preferred form, obviously modifications and changes may be made without departing from the spirit of the invention or the scope of the claims.

I claim:—

1. An electric generator, comprising a stationary shell, a main wheel with a peripheral flange, means by which the wheel is attached to the shell, a rotating armature shaft, an auxiliary wheel carried by the shaft and disposed within the main wheel, and interposed anti-friction means for sustaining the weight of the auxiliary wheel and shaft along a portion of the flange of the main wheel.

2. An electric generator, including a stationary shell, and rotating armature shaft; a peripherally flanged main wheel, means including brackets by which the wheel is secured to the shell; an auxiliary wheel carried by the shaft and extending between the end of the shell and the main wheel into proximity to said flange, and interposed anti-friction means for sustaining the radial and axial thrust.

3. The combination, of a stationary shell, with a peripherally flanged main wheel, with means by which it is secured to the shell, and a rotating armature shaft disposed longitudinally of the shell, with an auxiliary wheel keyed thereon, between the end of the shell and the main wheel, with suitably disposed anti-friction means for sustaining end and peripheral thrusts.

4. The combination in an electric generator, of a central generator structure, with an axially disposed motor at each end; an armature shaft common to both motors and the generator, and a bearing structure operatively associated with the shaft and the motors at the respective ends, including a peripherally flanged main wheel, and an auxiliary wheel operating within said main wheel, having interposed anti-friction means for sustaining the weight of the imposed parts at the flange of said main wheel.

5. A motor generator set of the type described, including an operatively embodied motor by means of which it is driven; an internal flange carried by the motor shell, with an annular recess having slip rings insulatively mounted therein, and an operatively associated brush holder, with adjustable brushes for the respective rings.

6. A motor generator set of the type described, including an operatively embodied motor by means of which it is driven; an internal flange carried by the motor shell, with an annular recess having slip rings insulatively mounted therein, an operatively associated brush holder, with adjustable brushes for the respective rings, and means operatively associated with the motor shell for adjusting the brush holder and maintaining it in its adjusted positions.

7. A motor generator set of the type described, including an operatively embodied motor by means of which it is driven; an internal flange carried by the motor shell, with an annular recess having slip rings insulatively mounted therein, an operatively associated brush holder, with adjustable brushes for the respective rings, and means operatively associated with the motor shell for maintaining the brush holder in adjusted positions, including a spring pressed shell-carried member, and serrations on a portion of the brush holder.

8. A motor generator set including an operatively embodied motor by means of which it is driven, an internal flange carried by the motor shell having an annular recess, slip rings insulatively mounted in the recess, a brush holder having a plurality of arms, brushes for the respective rings adjustably carried by the arms, means to shift the brush holder including a bridge piece secured to certain ones of the arms and a handle carried by the bridge piece, means on one of the arms providing a roughened place, and means carried by the motor shell to engage the roughened place to hold the brush holder in adjusted positions, said means including a plug with associated means to hold it in the engaging position.

9. A motor generator set including a motor frame, a shaft carrying an armature cooperating with field pole pieces carried by the frame, an insulating disk carried by the shaft having armature wires brought through for contacts, an internal flange on the motor frame, slip rings carried by the flange and having connections with said field pole pieces, a brush holder having a plurality of arms, and different sets of brushes carried by the arms to bear against said rings and said disks respectively.

10. A motor generator set including a motor frame having field pole pieces, a shaft having an armature cooperating with said field pole pieces, an insulating disk fixed on the shaft at which the ends of windings of the armature are brought through to form contacts, an internal flange on the motor frame, slip rings insulatively carried by the flange, a brush holder including a hub which bears on the shaft and a plurality of arms radiating from the hub, different sets of brushes carried by the brush holder arms to cooperate with the slip rings and insulating disk respectively, and means carried by the motor frame to engage the brush holder and hold it in an adjusted position in respect to the motor frame.

11. A motor generator set comprising a generator frame with field pole pieces, a motor frame at each end of the generator frame each having field pole pieces, a shaft carrying armatures for the generator and motor frames, a bearing cone adjacent to each end of the shaft, a main wheel running on bearing means engaging each cone, a circular flange extending from the wheel, an auxiliary wheel situated within the limits of the flange, and bearing means between the auxiliary wheel, the main wheel and flange to take radial and axial thrusts.

12. A motor generator set comprising a generator frame having field pole pieces, a motor frame mounted at each end of the generator frame and having field pole pieces, a shaft having armatures for the generator and motor pole pieces, an auxiliary wheel mounted adjacent to each end of the shaft, a bearing cone adjacent to each auxiliary wheel, a main wheel running on bearing means engaging the bearing cones, a circular flange carried by each main wheel extending over the peripheries of the auxiliary wheels, bearing means at the periphery and side of each auxiliary wheel engaging the flanges and main wheels, and means by which each main wheel is fixed to the adjacent motor frame.

13. A motor generator set comprising a generator frame having field pole pieces, a motor frame situated adjacent each end of the generator frame and having field pole pieces, a flange included in each motor frame by means of which attachment to the generator frame is made, internal flanges in the generator frame, a ring insulatively mounted on each flange, an internal flange on each motor frame, slip rings insulatively mounted on said flanges, a shaft carrying a generator armature and commutators, an armature for each motor also carried by the shaft, brush holders carried by the generator frame ring, an insulating disk for each motor armature having the ends of each armature winding arranged into contacts, a brush holder having brushes cooperating with each disk and the adjacent slip rings, a flanged main wheel for each motor frame, means by which each wheel is affixed to the adjacent motor frame to remain stationary therewith, bearing means carried by the shaft to cooperate with each main wheel, and an auxiliary wheel affixed to the shaft adjacent to each motor frame having interposed peripheral and axial bearing means contacting adjacent parts of the main wheel.

WILLIAM ROBERT GARNER.